US012646370B2

(12) United States Patent
Chigurupati et al.

(10) Patent No.: US 12,646,370 B2
(45) Date of Patent: Jun. 2, 2026

(54) TECHNIQUES FOR PERSONAL IDENTIFICATION NUMBER MANAGEMENT FOR CONTACTLESS CARDS

(71) Applicant: Capital One Services, LLC, McLean, VA (US)

(72) Inventors: Srinivasa Chigurupati, Long Grove, IL (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 143 days.

(21) Appl. No.: 17/865,547

(22) Filed: Jul. 15, 2022

(65) Prior Publication Data

US 2024/0021041 A1 Jan. 18, 2024

(51) Int. Cl.
*G07F 7/10* (2006.01)
*H04L 9/32* (2006.01)

(52) U.S. Cl.
CPC .......... *G07F 7/1016* (2013.01); *H04L 9/3226* (2013.01)

(58) Field of Classification Search
CPC ............................ G07F 7/1016; H04L 9/3226
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |

| | | | |
|---|---|---|---|
| 4,849,613 A * | 7/1989 | Eisele .................. | G07F 7/1008 |
| | | | 705/72 |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,590,038 A | 12/1996 | Pitroda | |
| 5,592,553 A | 1/1997 | Guski et al. | |
| 5,616,901 A | 4/1997 | Crandall | |
| 5,666,415 A | 9/1997 | Kaufman | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Danushka Jayasinghe, et al., Enhancing EMV Online PIN Verification, Dec. 3, 2015, IEEE, pp. 808-817 (Year: 2015).*

(Continued)

*Primary Examiner* — Nilesh B Khatri
(74) *Attorney, Agent, or Firm* — KDW Firm PLLC

(57) ABSTRACT

Embodiments disclosed herein provide techniques for secure PIN management for contactless cards using an application on a computing device such as a mobile computing device. In some embodiments, the computing device may have an application installed enabling the computing device to act as a secure endpoint that enables communication between the contactless card and a backend server to facilitate PIN management. For example, the application may enable a mobile device to be utilized to view and/or change the PIN associated with a contactless card that is brought in proximity of the mobile device.

20 Claims, 10 Drawing Sheets

(56) References Cited

U.S. PATENT DOCUMENTS

| | | |
|---|---|---|
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |

(56) References Cited

U.S. PATENT DOCUMENTS

| | | | |
|---|---|---|---|
| 8,559,872 B2 | 10/2013 | Butler | |
| 8,566,916 B1 | 10/2013 | Bailey et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | de Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,317,704 B2 * | 4/2016 | Brudnicki | G06Q 20/3227 |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,935,772 B1 * | 4/2018 | Madisetti | G06F 21/6209 |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,565,587 B1 * | 2/2020 | Newman | H04L 9/0861 |
| 10,581,611 B1 | 3/2020 | Osborn | |
| 10,664,830 B1 | 5/2020 | Rule | |
| 10,685,349 B2 | 6/2020 | Brickell | |
| 10,726,160 B2 * | 7/2020 | Robinton | H04W 12/06 |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |

(56)                    References Cited

U.S. PATENT DOCUMENTS

| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,658,823 | B1* | 5/2023 | Reitman ............... H04L 9/0838 |
| | | | 713/168 |
| 11,777,933 | B2 | 10/2023 | Moreton |
| 12,014,354 | B1* | 6/2024 | Cook ....................... H04B 5/72 |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0099664 | A1* | 7/2002 | Cohen ............... G06Q 20/3825 |
| | | | 705/67 |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0187012 | A1* | 9/2004 | Kohiyama .......... G06F 21/6245 |
| | | | 713/193 |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0257272 | A1* | 11/2005 | Nakao ..................... G06F 21/57 |
| | | | 726/26 |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2007/0294753 | A1* | 12/2007 | Tanaka ............... H04N 21/4516 |
| | | | 713/168 |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Landau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham, II et al. |
| 2008/0209543 | A1 | 8/2008 | Aaron |
| 2008/0223918 | A1 | 9/2008 | Williams et al. |
| 2008/0285746 | A1 | 11/2008 | Landrock et al. |
| 2008/0308641 | A1 | 12/2008 | Finn |
| 2009/0037275 | A1 | 2/2009 | Pollio |
| 2009/0048026 | A1 | 2/2009 | French |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Ameil et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0308110 | A1 | 12/2010 | Maddocks |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadarajan |
| 2011/0125638 | A1 | 5/2011 | Davis et al. |
| 2011/0131415 | A1 | 6/2011 | Schneider |
| 2011/0153437 | A1 | 6/2011 | Archer et al. |
| 2011/0153496 | A1 | 6/2011 | Royyuru |
| 2011/0155801 | A1 | 6/2011 | Rowberry |
| 2011/0208658 | A1 | 8/2011 | Makhotin |
| 2011/0208965 | A1 | 8/2011 | Machani |
| 2011/0211219 | A1 | 9/2011 | Bradley et al. |
| 2011/0218911 | A1 | 9/2011 | Spodak |
| 2011/0238564 | A1 | 9/2011 | Lim et al. |
| 2011/0246780 | A1 | 10/2011 | Yeap et al. |
| 2011/0258452 | A1 | 10/2011 | Coulier et al. |
| 2011/0280406 | A1 | 11/2011 | Ma et al. |
| 2011/0282785 | A1 | 11/2011 | Chin |
| 2011/0294418 | A1 | 12/2011 | Chen |
| 2011/0295753 | A1* | 12/2011 | Reno ..................... H04L 9/0825 |
| | | | 705/72 |
| 2011/0312271 | A1 | 12/2011 | Ma et al. |
| 2012/0024947 | A1 | 2/2012 | Naelon |
| 2012/0030047 | A1 | 2/2012 | Fuentes et al. |
| 2012/0030121 | A1 | 2/2012 | Grellier |

(56)        References Cited

U.S. PATENT DOCUMENTS

| | | |
|---|---|---|
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0298027 A1* | 10/2014 | Roberts .................. G06Q 20/20 713/171 |
| 2014/0337235 A1 | 11/2014 | Van Heerden et al. |
| 2014/0339315 A1 | 11/2014 | Ko |
| 2014/0344166 A1* | 11/2014 | Maddocks ............ H04W 12/37 705/72 |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178722 A1* | 6/2015 | Alger .................. G06Q 20/204 705/44 |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0036594 A1* | 2/2016 | Conrad .................. G06F 21/35 713/185 |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0104154 A1* | 4/2016 | Milov .................. G06Q 20/401 705/67 |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |

(56) References Cited

U.S. PATENT DOCUMENTS

| | | |
|---|---|---|
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205554 A1* | 7/2018 | Blinn .................... H04L 9/3236 |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0106600 A1* | 4/2020 | Dreifus ................. H04L 9/3066 |
| 2021/0004806 A1* | 1/2021 | Noe ................... G06Q 20/3278 |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0245984 A1* | 8/2022 | Wang ................. G06K 19/0718 |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |
| 2024/0045934 A1* | 2/2024 | Chen ....................... G06F 21/31 |
| 2024/0419824 A1* | 12/2024 | Rodriguez ............ G06F 21/602 |

FOREIGN PATENT DOCUMENTS

| | | | |
|---|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| EP | 3975012 A1 | 3/2022 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 9910824 A1 | 3/1999 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

(56) References Cited

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon. com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE Africon at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

The International Search Report and Written Opinion mailed Oct. 5, 2023 for corresponding PCT/US2023/027601 (13 pages).

The International Preliminary Report on Patentability issued Dec. 15, 2024 for corresponding PCT/US2023/027601 (six (6) pages).

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

(56)  References Cited

OTHER PUBLICATIONS

Smart Card Alliance, "Co-Branded Multi-Application Contactless Cards for Transit and Financial Payment," A Smart Card Alliance Transportation Council White Paper (40 pages), Mar. 2008.

* cited by examiner

SERVICE PROVIDER

SMART CARD 1234  5678  1234  5678

CARDHOLDER NAME

EXPIRATION DATE

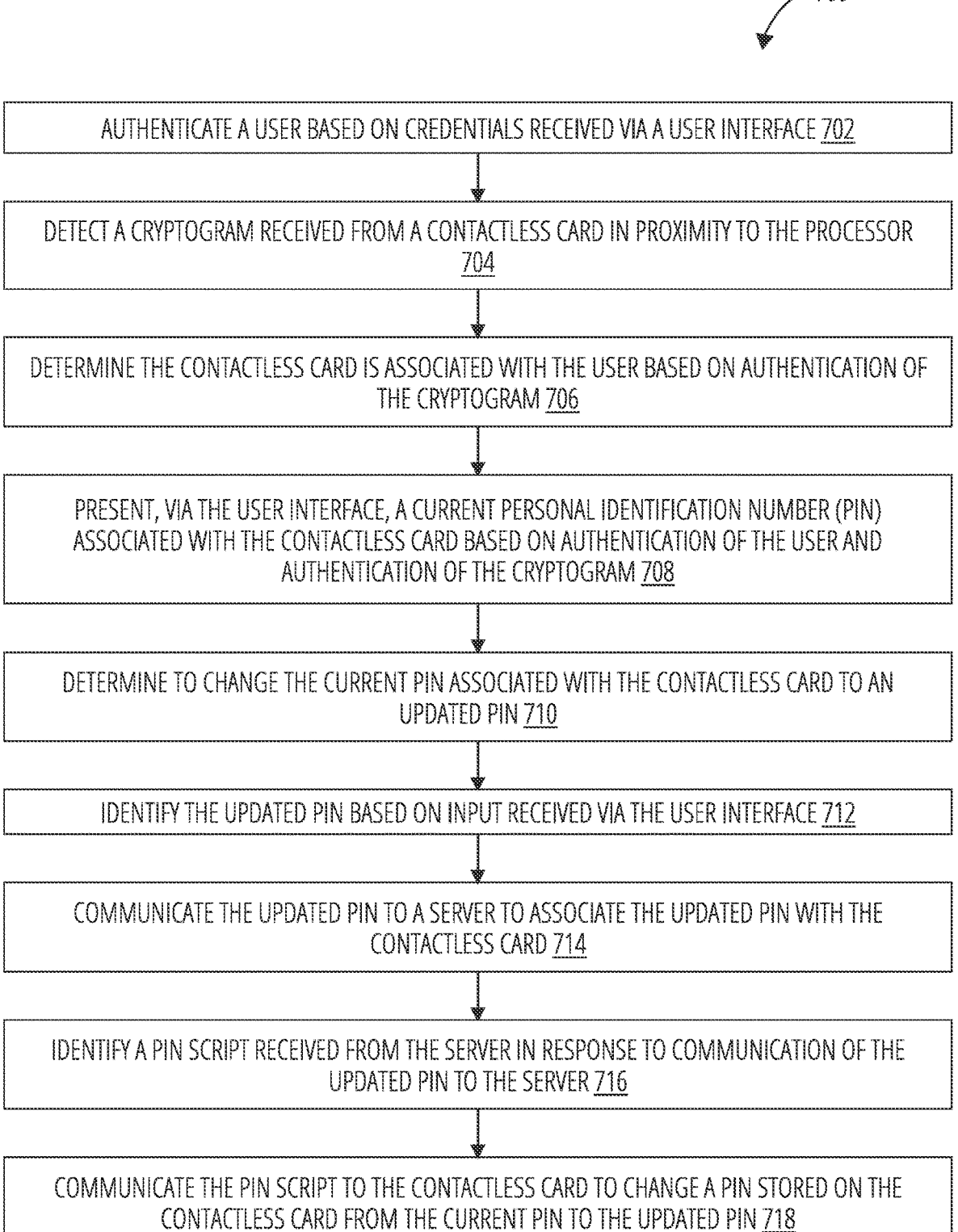

700

AUTHENTICATE A USER BASED ON CREDENTIALS RECEIVED VIA A USER INTERFACE 702

DETECT A CRYPTOGRAM RECEIVED FROM A CONTACTLESS CARD IN PROXIMITY TO THE PROCESSOR 704

DETERMINE THE CONTACTLESS CARD IS ASSOCIATED WITH THE USER BASED ON AUTHENTICATION OF THE CRYPTOGRAM 706

PRESENT, VIA THE USER INTERFACE, A CURRENT PERSONAL IDENTIFICATION NUMBER (PIN) ASSOCIATED WITH THE CONTACTLESS CARD BASED ON AUTHENTICATION OF THE USER AND AUTHENTICATION OF THE CRYPTOGRAM 708

DETERMINE TO CHANGE THE CURRENT PIN ASSOCIATED WITH THE CONTACTLESS CARD TO AN UPDATED PIN 710

IDENTIFY THE UPDATED PIN BASED ON INPUT RECEIVED VIA THE USER INTERFACE 712

COMMUNICATE THE UPDATED PIN TO A SERVER TO ASSOCIATE THE UPDATED PIN WITH THE CONTACTLESS CARD 714

IDENTIFY A PIN SCRIPT RECEIVED FROM THE SERVER IN RESPONSE TO COMMUNICATION OF THE UPDATED PIN TO THE SERVER 716

COMMUNICATE THE PIN SCRIPT TO THE CONTACTLESS CARD TO CHANGE A PIN STORED ON THE CONTACTLESS CARD FROM THE CURRENT PIN TO THE UPDATED PIN 718

FIG. 7

800

RECEIVE, BY A CONTACTLESS CARD, REQUEST FOR IDENTIFYING INFORMATION FROM A COMPUTING DEVICE 802

GENERATE, BY THE CONTACTLESS CARD, A CRYPTOGRAM COMPRISING THE IDENTIFYING INFORMATION 804

COMMUNICATE, BY THE CONTACTLESS CARD, THE CRYPTOGRAM TO THE COMPUTING DEVICE 806

RECEIVE, BY THE CONTACTLESS CARD, A PIN SCRIPT FROM THE COMPUTING DEVICE, WHEREIN THE PIN SCRIPT COMPRISES ONE OR MORE INSTRUCTIONS CONFIGURED TO CAUSE THE CONTACTLESS CARD TO CHANGE A CURRENT PIN TO A NEW PIN 808

CAUSE, BY THE CONTACTLESS CARD, THE CURRENT PIN TO CHANGE TO THE NEW PIN BASED ON THE PIN SCRIPT 810

FIG. 8

TECHNIQUES FOR PERSONAL IDENTIFICATION NUMBER MANAGEMENT FOR CONTACTLESS CARDS

FIELD

Embodiments disclosed herein generally relate to computing platforms, and more specifically, to computing platforms for secure, personal identification number (PIN) management for contactless cards.

BACKGROUND

A personal identification number (PIN), or sometimes redundantly a PIN number or PIN code, is a numeric (sometimes alphanumeric) passcode used in the process of authenticating a user accessing a system. The PIN has been the key to facilitating the private data exchange between different data-processing centers in computer networks for financial institutions, governments, and enterprises. PINs may be used to authenticate banking systems with cardholders, governments with citizens, enterprises with employees, and computers with users, among other uses. In common usage, PINs are used in ATM or POS transactions, secure access control (e.g., computer access, door access, car access, etc.), internet transactions, or to log into a restricted website.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates to an apparatus, comprising a processor and memory comprising instructions that when executed by the processor, cause the processor to perform one or more of authenticate a user based on credentials received via a user interface; detect a cryptogram received from a contactless card in proximity to the processor; determine the contactless card is associated with the user based on authentication of the cryptogram; present, via the user interface, a current personal identification number (PIN) associated with the contactless card based on authentication of the user and authentication of the cryptogram; determine to change the current PIN associated with the contactless card to an updated PIN; identify the updated PIN based on input received via the user interface; communicate the updated PIN to a server to associate the updated PIN with the contactless card; identify a PIN script received from the server in response to communication of the updated PIN to the server; and communicate the PIN script to the contactless card to change a PIN stored on the contactless card from the current PIN to the updated PIN.

In some embodiments, a mobile device comprises the processor and the memory and the cryptogram is received from the contactless card via near field communication. In various embodiments, the instructions, when executed by the processor, further cause the processor to communicate the cryptogram to the server and receive a verification from the server to authenticate the cryptogram. In many embodiments, the instructions, when executed by the processor, further cause the processor to encrypt the updated PIN for communication to the server. In many such embodiments, the instructions, when executed by the processor, further cause the processor to encrypt the updated PIN based on a unique identifier (UID) received from the contactless card. In many further such embodiments, the instructions, when executed by the processor, further cause the processor to generate a session key with the UID to encrypt the updated PIN based on the UID. In several embodiments, the instructions, when executed by the processor, further cause the processor to authenticate the PIN script based on a message authentication code (MAC) received from the server. In several such embodiments, the instructions, when executed by the processor, further cause the processor to utilize an integration key to authenticate the PIN script based on the MAC received from the server.

In another aspect, the present disclosure relates to at least one non-transitory computer-readable medium comprising a set of instructions that, in response to being executed by a processor circuit, cause the processor circuit to perform one or more of: authenticate a user based on credentials received via a user interface; detect a cryptogram received from a contactless card in proximity to the processor; determine the contactless card is associated with the user based on authentication of the cryptogram; present, via the user interface, a current personal identification number (PIN) associated with the contactless card based on authentication of the user and authentication of the cryptogram; determine to change the current PIN associated with the contactless card to an updated PIN; identify the updated PIN based on input received via the user interface; communicate the updated PIN to a server to associate the updated PIN with the contactless card; identify a PIN script received from the server in response to communication of the updated PIN to the server; and communicate the PIN script to the contactless card to change a PIN stored on the contactless card from the current PIN to the updated PIN.

In some embodiments, the set of instructions, in response to execution by the processor circuit, further cause the processor circuit to communicate the cryptogram to the server and receive a verification from the server to authenticate the cryptogram. In various embodiments, the set of instructions, in response to execution by the processor circuit, further cause the processor circuit to encrypt the updated PIN for communication to the server. In several embodiments, the set of instructions, in response to execution by the processor circuit, further cause the processor circuit to encrypt the updated PIN based on a unique identifier (UID) received from the contactless card. In several such embodiments, the set of instructions, in response to execution by the processor circuit, further cause the processor circuit to generate a session key with the UID to encrypt the updated PIN based on the UID. In many embodiments, the set of instructions, in response to execution by the processor circuit, further cause the processor circuit to authenticate the PIN script based on a message authentication code (MAC) received from the server. In many such embodiments, the set of instructions, in response to execution by the processor circuit, further cause the processor circuit to utilize an integration key to authenticate the PIN script based on the MAC received from the server.

In yet another aspect, the present disclosure relates to a computer-implemented method, comprising one or more of: authenticating a user based on credentials received via a user interface; detecting a cryptogram received from a contactless card; determining the contactless card is associated with the user based on authentication of the cryptogram; presenting, via the user interface, a current personal identification number (PIN) associated with the contactless card based on authentication of the user and authentication of the cryptogram; determining to change the current PIN associated with the contactless card to an updated PIN; identifying the updated PIN based on input received via the user interface; communicating the updated PIN to a server to associate the updated PIN with the contactless card; identifying a PIN script received from the server in response to communication of the updated PIN to the server; and communicating the PIN script to the contactless card to change a PIN stored on the contactless card from the current PIN to the updated PIN.

Some embodiments include encrypting the updated PIN for communication to the server. Some such embodiments include encrypting the updated PIN based on a unique identifier (UID) received from the contactless card. Some further such embodiments include generating a session key with the UID to encrypt the updated PIN based on the UID. Various embodiments include authenticating the PIN script based on a message authentication code received from the server.

BRIEF DESCRIPTION OF THE DRAWINGS

FIG. 7 illustrates a logic flow according to one or more embodiments described hereby.

FIG. 8 illustrates a routine 800 in accordance with embodiments.

DETAILED DESCRIPTION

Figure 1:
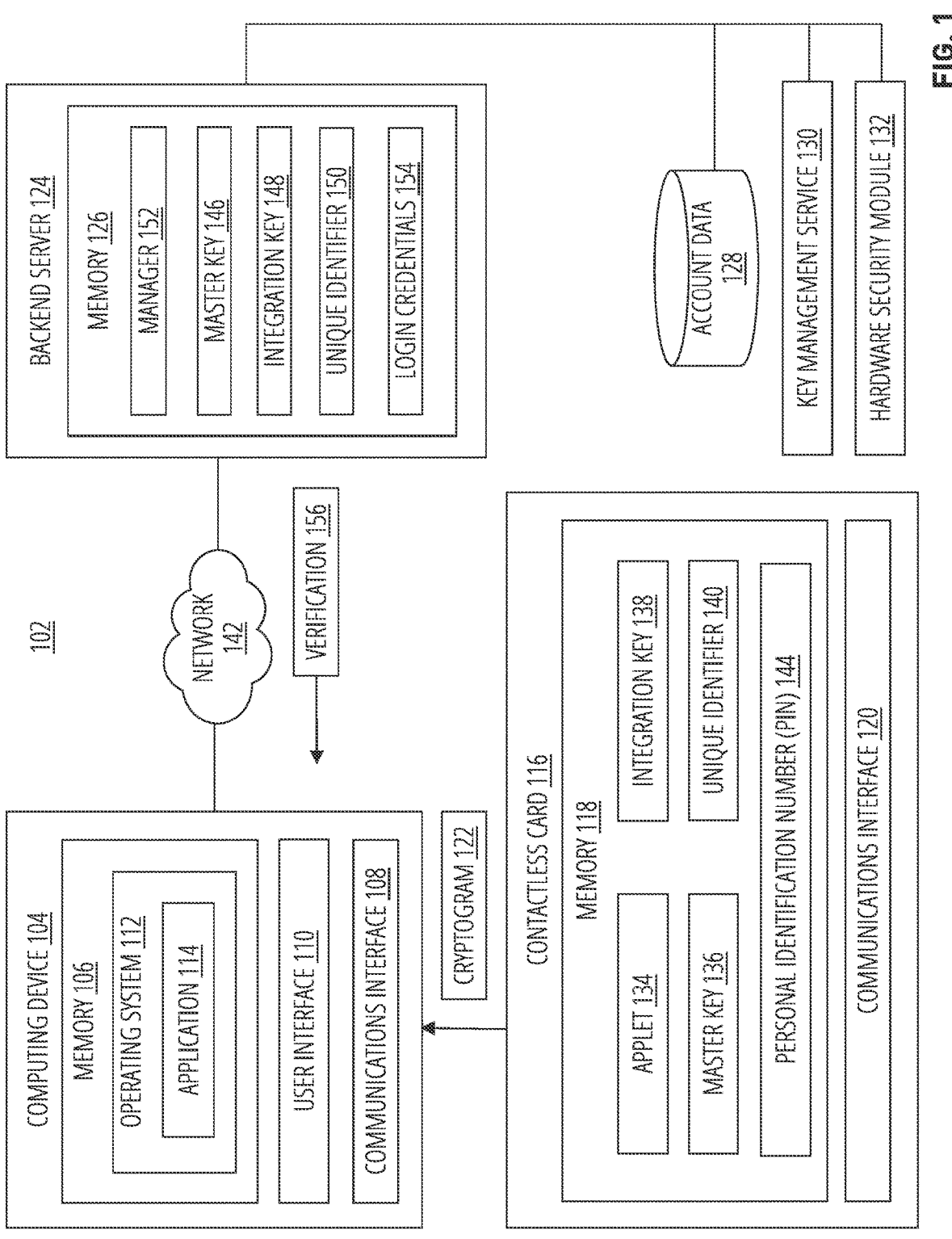
FIG. 1 illustrates various aspects of an exemplary system for PIN management according to one or more embodiments described hereby.

Embodiments disclosed herein provide techniques for secure PIN management for contactless cards using an application on a computing device such as a mobile computing device. In some embodiments, the computing device may have an application installed, enabling the computing device to act as a secure endpoint that enables the communication between the contactless card and a backend server to facilitate PIN management. For example, the application may enable a mobile device to be utilized to view and/or change the PIN associated with a contactless card that is brought in proximity of the mobile device. These and other embodiments are described and claimed.

In one embodiment, a user may install an application on a computing device. The user may then provide login credentials to access the application. Once logged in, the application may instruct the user to bring the contactless card within sufficient proximity of the computing device to enable near-field communication between the contactless card and the computing device. For example, the application may instruct the user to tap the contactless card on the device. Doing so may cause or instruct the contactless card to generate a cryptogram, which may be included as part of a data package, such as an NFC Forum Data Exchange Format (NDEF) file. The data package may further include an unencrypted customer identifier (ID) or any other unique identifier. The application may read the data package via NFC and transmit the data package to the server for PIN management authorization. For PIN management authorization, the server may verify the contactless card, and the application is associated with a common authorized user. For example, the server may authenticate the cryptogram, such as using the received data package, and the server may confirm the login credentials utilized to access the application correspond to the same user associated with the contactless card for which PIN management is sought. If the server is able to authorize PIN management, the application may be utilized to view and/or edit a PIN associated with the contactless card.

Advantageously, embodiments disclosed herein provide techniques to perform PIN management operations securely from a computing device with an application installed. By leveraging cryptograms generated by a contactless card associated with a user combined with accessing the application by providing login credentials that correspond to the user, embodiments of the disclosure may enable the computing device to act as a secure endpoint for PIN management operations associated with the contactless card with minimal risk of fraudulent activity. Additionally, techniques described hereby can enable a user to view a PIN without having to change or reset the PIN, thereby improving the customer experience. Furthermore, by using a computing device with the application installed, a user is not required to utilize the contactless card at a point-of-sale contact terminal to receive a PIN change script to change the PIN on the contactless card thereby further improving customer experience as well as system efficiency.

With general reference to notations and nomenclature used herein, one or more portions of the detailed description that follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms such as adding or comparing, which are commonly associated with mental operations performed by a human operator. However, no such capability of a human operator is necessary or desirable in most cases in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-a (or 123a) may include components 123-1, 123-2, 123-3, 123-4, and 123-5. The embodiments are not limited in this context.

FIG. 1 illustrates various aspects of a PIN management system 102 according to one or more embodiments described hereby. Generally, the PIN management system 102 may be utilized to enable a user to view and edit the PIN 144 associated with contactless card 116 via computing device 104. The illustrated embodiment includes a cryptogram 122 generated by contactless card 116 and provided to computing device 104. In several embodiments, the computing device 104, such as via application 114, may send the cryptogram 122 to the backend server 124 for authentication. In several such embodiments, PIN management functionality may be provided via application 114 in response to successful validation of the cryptogram 122, which may be received by computing device 104 as verification 156.

The PIN management system 102 includes a computing device 104, contactless card 116, backend server 124, account data 128, key management service 130, and hardware security module 132. The contactless card 116 includes a communications interface 120 and memory 118 with applet 134, master key 136, integration key 138, unique identifier 140, and PIN 144.

The computing device 104 is communicatively coupled to the backend server 124 via network 142 and includes memory 106, user interface 110, and communications interface 108. The memory 106 includes an operating system 112 with application 114. The backend server 124 includes memory 126 with manager 152, master key 146, integration key 148, unique identifier 150, and login credentials 154. It will be appreciated that one or more items in memories 106, 118, 126 may be in an encrypted or unencrypted format without departing from the scope of this disclosure. Additionally, one or more items in memories 106, 118, 126 may be passed between different ones of memories 106, 118, 126 in an encrypted or unencrypted format.

Although the system 100 shown in FIG. 1, has a limited number of elements in a certain topology, it may be appreciated that the PIN management system 102 may include more or fewer elements in alternate topologies as desired for a given implementation without departing from the scope of this disclosure. For example, one or more of account data 128, key management service 130, and hardware security module 132 may be incorporated into backend server 124 without departing from the scope of this disclosure. In another example, one or more operations may be performed by computing device 104 instead of backend server 124 or contactless card 116 without departing from the scope of this disclosure. Embodiments are not limited in this context.

In various embodiments, the illustrated embodiment relates to various steps of authenticating a contactless card and a computing device of a user to act as a secure endpoint to provide PIN management functionality for a contactless card. The contactless card 116 is representative of any type of payment card, such as a credit card, debit card, ATM card, gift card, and the like. The contactless card 101 may comprise one or more communications interfaces 120, such as a radio frequency identification (RFID) chip, configured to communicate with a communications interface 108 (also referred to herein as a "card reader", a "wireless card reader", and/or a "wireless communications interface") of the computing device 104 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 104 is representative of any number and type of computing device, such as smartphones, tablet computers, wearable devices, laptops, portable gaming devices, virtualized computing system, desktop computers, and the like. The backend server 124 is representative of any type of computing device, such as a server, workstation, compute cluster, cloud computing platform, virtualized computing system, and the like. Although not depicted for the sake of clarity, the computing device 104, contactless card 116, and backend server 124 each include one or more processor circuits to execute programs, code, and/or instructions.

As previously mentioned, the memory 118 of the contactless card 116 includes applet 134, master key 136, integration key 138, unique identifier 140, and PIN 144. The applet 134 is executable code configured to perform the operations described herein. The master key 136, integration key 138, unique identifier 140, and PIN 144 are used to provide security in the system 102, as described in greater detail below. As previously mentioned, the memory 106 of the computing device 104 includes an instance of an operating system (OS) 112. Example operating systems 112 include the Android® OS, iOS®, macOS®, Linux®, and Windows® operating systems. As shown, the OS 112 includes one or more applications, including application 114. The application 114 is software that allows the computing device 104 to interact and communicate with contactless card 116 and backend server 124 in a manner to provide PIN management functionality. As previously mentioned, the memory 126 of the backend server 124 includes manager 152, master key 146, integration key 148, unique identifier 150, and login credentials 154. As described in greater detail herein, the manager 152 is configured to interact with application 114 of computing device 104 to facilitate one or more backend PIN management functionalities described hereby. In at least one embodiment, the interactions between components may be provided via one or more application programming interfaces (APIs). In some embodiments, the integration key 148 is utilized for calculating message authentication codes.

In the embodiment depicted in FIG. 1, a user may log into the application 114 by providing login credentials via user interface 110. The provided login credentials may be compared to login credentials 154 associated with the user to enable the user to access the application 114. For example, manager 152 may compare the provided login credentials to login credentials 154. In another example, manager 152 may utilize key management service 130 or hardware security module 132 to compare the provided login credentials to login credentials 154. In some embodiments, the login credentials 154, or a portion thereof, may be retrieved from account data 128. In one embodiment, the login credentials 154 may be stored on computing device 104. In such embodiments, application 114 may compare the provided login credentials to login credentials 154.

Once the user is logged into application 114, the user may be instructed to tap the contactless card 116 to the computing device 104 (or otherwise bring the contactless card 101 within communications range of the card reader of the computing device 104). In some embodiments, the user is instructed to tap the contactless card 116 to the computing device 104 in response to selecting a PIN management option in the application 114.

Generally, once the contactless card 116 is brought within communications range of the communications interface 108 of the computing device 104, the applet 134 of the contactless card 116 may generate a cryptogram 122. The cryptogram 122 may be based on the one or more of the master key 136, integration key 138, unique identifier 140, and PIN 144 of the contactless card 116. For example, the applet 134 may produce the cryptogram 122 based on the master key 136 and the unique identifier 140. The cryptogram may be generated based on any suitable cryptographic technique. In some embodiments, the applet 134 may include the cryptogram 122 and a customer ID (and/or any other unique identifier) in a data package. In at least one embodiment, the data package including the cryptogram 122 and customer ID is an NDEF file.

In embodiments, the computing device 104 may receive the cryptogram 122 from the contactless card 116. The computing device 104 may send the cryptogram 122 to the backend server 124, and in some embodiments, the backend server 124 may determine the contactless card 116 is associated with a user based on the cryptogram 122. For example, the backend server 124 may verify the information in the cryptogram 122 against stored information on the backend server 124.

The PIN management system 102 is configured to implement key diversification to secure data, which may be referred to as a key diversification technique herein. Generally, the backend server 124 (or another computing device) and the contactless card 116 may be provisioned with the same master key 136, 146 (also referred to as a master symmetric key). More specifically, each contactless card 116 is programmed with a distinct master key that has a corresponding pair in the backend server 124. For example, when a contactless card 116 is manufactured, a unique master key may be programmed into the memory 118 of the contactless card 116. Similarly, the unique master key may be stored in a record of a customer associated with the contactless card 116 in the account data 128 of the backend server 124 (and/or stored in a different secure location, such as the hardware security module (HSM) 132). The master key may be kept secret from all parties other than the contactless card 116 and backend server 124, thereby enhancing the security of the system 102.

In some embodiments, the applet 134 of the contactless card 116 may encrypt and/or decrypt data (e.g., the unique identifier 140) using the master key 136 and the data as input to a cryptographic algorithm. For example, encrypting the unique identifier 140 with the master key 136 may result in the cryptogram 122. Similarly, the backend server 124 may encrypt and/or decrypt data associated with the contactless card 116 using the corresponding master key 146.

In some instances, the contactless card 116 and the backend server 124 may utilize their master keys to generate session keys, as discussed. The session keys may be utilized to encrypt/decrypt the data by the contactless card 116 and the backend server 124. For example, the master keys 136, 146 of the contactless card 116 and backend server 124 may be used in conjunction with one or more counters to enhance security using key diversification. The counters may comprise values that are synchronized between the contactless card 116 and backend server 124. The counter value may comprise a number that changes each time data is exchanged between the contactless card 116 and the backend server 124 (and/or the contactless card 116 and the computing device 104). When preparing to send data (e.g., to the backend server 124 and/or the computing device 104), the applet 134 of the contactless card 116 may increment the counter value. The applet 134 of the contactless card 116 may then provide the master key 136 and counter value as input to a cryptographic algorithm, which produces a diversified key as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 116 may then encrypt the data (e.g., the unique identifier 140 and/or any other data) using the diversified key and the data as input to the cryptographic algorithm. For example, encrypting the unique identifier 140 with the diversified key may result in the encrypted customer ID (e.g., a cryptogram) included in a data package communicated to computing device 104. The application 114 may then read the data package including the cryptogram 122 and unencrypted customer ID via the communications interface 108.

Regardless of the encryption technique used, application 114 may then transmit the data package including the cryptogram 122 and unencrypted customer ID to the backend server 124 via the network 142. The application 114 may further indicate, to the backend server 124, that the data package including the cryptogram 122 and unencrypted customer ID was read from the contactless card 116 via the communications interface 108 of the computing device 104.

Once received, the manager 152 may attempt to authenticate the cryptogram 122. For example, the manager 152 may include an authentication application that attempts to decrypt the cryptogram 122 using a copy of the master key 146 stored by the backend server 124. In some embodiments, the manager 152 may identify the master key 146 and counter value using the unencrypted customer ID included in the data package. In some examples, the manager 152 may provide the master key 146 and counter value as input to the cryptographic algorithm (e.g., in key management service 130), which produces a diversified key as output. The resulting diversified key may correspond to the diversified key of the contactless card 116, which may be used to decrypt the cryptogram 122 in the data package.

The manager 152 may successfully decrypt the cryptogram 122, thereby verifying or authenticating the cryptogram 122 in the data package (e.g., by comparing the unique identifier 140 that is produced by decrypting the cryptogram 122 to a known unique identifier 150 stored in the account data 128, and/or based on an indication that the decryption using the master key and/or diversified key was successful.

Although one or more keys and/or identifiers are depicted as being stored in the memories 118, 126, the one or more keys and/or identifiers may be stored elsewhere, such as in a secure element and/or the hardware security module 132. In such embodiments, the secure element and/or the hardware security module 132 may decrypt the cryptogram using the keys and a cryptographic function. Similarly, the secure element and/or hardware security module 132 may generate the diversified key based on the master key 146 and counter value as described above. If the decryption is successful, the manager 152 may enable PIN management functionality to be accessed and/or provided via application 114 of computing device 104, such as by sending verification 156. As will be described in more detail below, such as with respect to FIG. 2, PIN management functionality may include viewing and/or changing the PIN 144 in memory 118, which corresponds to PIN 146 (deleted) in memory 126.

If, however, the manager 152 is unable to decrypt the cryptogram 122 to yield the expected result (e.g., the unique identifier 140 or customer ID of the account associated with the contactless card 116), the manager 152 does not validate the cryptogram 122. In such an example, the manager 152 determines to refrain from enabling PIN management functionality via the application 114 of computing device 104. The manager 152 may transmit an indication of the failed decryption to the application 114 of computing device 104. The application 114 may then display an indication of the failed decryption via the user interface 110, and, therefore, denial of access to PIN management functionality to the user via the user interface 110.

Figure 2:
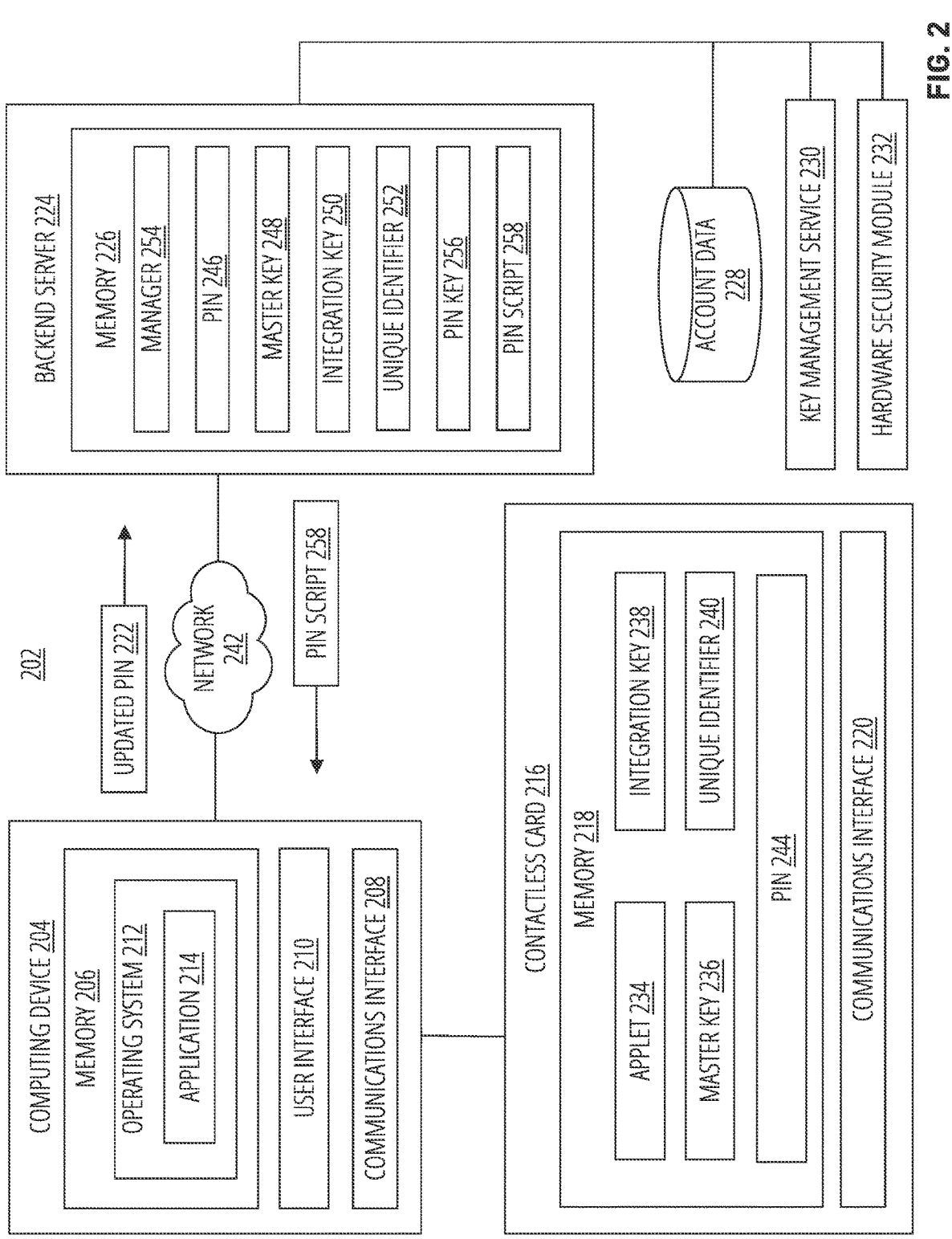
FIG. 2 illustrates aspects of an exemplary system for PIN management according to one or more embodiments described hereby.

FIG. 2 illustrates various aspects of a PIN management system 202 according to one or more embodiments described hereby. Generally, the PIN management system 202 may be utilized to enable a user to view and edit the PIN 244 associated with contactless card 216 via computing device 204. In some embodiments, the functionality described with respect to FIG. 2 may occur after the cryptogram verification described with respect to FIG. 1. The illustrated embodiment includes a request for an updated PIN 222 provided to backend server 224, such as based on input provided to application 214 via user interface 210.

In several embodiments, the backend server 224 may generate PIN script 258 based on the request for an updated PIN 222. In several such embodiments, the PIN script 258 may be communicated to the contactless card 216 by computing device 204 and used by applet 234 to install and/or change a current PIN to the update PIN 244 on the contactless card 216.

In various embodiments, the PIN management system 202 may be the same as PIN management system 102. The PIN management system 202 includes a computing device 204, contactless card 216, backend server 224, account data 228, key management service 230, and hardware security module 232. The contactless card 216 includes a communications interface 220 and memory 218 with applet 234, master key 236, integration key 238, unique identifier 240, and PIN 244. The computing device 204 is communicatively coupled to the backend server 224 via network 242 and includes memory 206, user interface 210, and communications interface 208. The memory 206 includes an operating system 212 with application 214. The backend server 224 includes memory 226 with manager 254, PIN 246, master key 248, integration key 250, unique identifier 252, PIN key 256, and PIN script 258. It will be appreciated that one or more items in memories 206, 218, 226 may be in an encrypted or unencrypted format without departing from the scope of this disclosure. Additionally, one or more items in memories 206, 218, 226 may be passed between different ones of memories 206, 218, 226 in an encrypted or unencrypted format. Although the system 200 shown in FIG. 2 has a limited number of elements in a certain topology, it may be appreciated that the PIN management system 202 may include more or less elements in alternate topologies as desired for a given implementation without departing from the scope of this disclosure. For example, one or more of account data 228, key management service 230, and hardware security module 232 may be incorporated into backend server 224 without departing from the scope of this disclosure. In another example, one or more operations may be performed by computing device 204 instead of backend server 224 or contactless card 216 without departing from the scope of this disclosure. Embodiments are not limited in this context.

In various embodiments, the illustrated embodiment relates to various aspects of PIN management functionality provided via computing device 204. In many embodiments, the aspects of PIN management described with respect to FIG. 2 may occur after user authentication and cryptogram authentication, such as one or more processes described with respect to FIG. 1. In some embodiments, PIN management functionality may include presenting, via the user interface 110, a current PIN (e.g., PIN 244) associated with the contactless card 216. A determination to change the current PIN associated with the contactless card 216 to an updated PIN may be made based on input provided to the application 214 via user interface 210. The updated PIN may be identified based on input received via the user interface 210. For example, a user may select an option to change their PIN, and then they may be prompted to provide an updated PIN. The updated PIN 222, including a request to update the PIN, may be communicated to the backend server 224 to associate the updated PIN with the contactless card 216. In many embodiments, the updated PIN 222 request may be encrypted by computing device 204 prior to communication to backend server 224. For example, the unique identifier 240 previously received from the contactless card 216 may be used to encrypt the updated PIN 222 prior to transmission to the backend server 224. In a further example, the computing device 204 may generate a session key with the unique identifier 240 and encrypt the updated PIN based on the unique identifier 240.

In some embodiments, the updated PIN 222 may be stored in account data 228 associated with the user. For example, the updated PIN 222 may be stored in account data 228 as an encrypted PIN block. Further, the manager 254 of backend server 224 may generate, or direct generation of, a PIN script 258 for changing the PIN on the contactless card 216. In various embodiments, the manager 254 may utilize one or more of account data 228, key management service 230, and hardware security module 232 to generate the PIN script 258. For example, the hardware security module 232 may generate the PIN script 258. The PIN script 258 may include one or more instructions or operations that may be performed by the contactless card 204 to store the new PIN 222 in secure memory. In some embodiments, the manager 254 may utilize the PIN key 256 to generate the PIN script 258. In one embodiment, the PIN key 256 may comprise a key that is common to a range of account numbers. For example, the PIN key 256 may correspond to the first 6 or 8 digits of an account number.

The PIN script 258 may be communicated to the computing device 204 by the backend server 224 via network 242. The PIN script 258 may then be communicated to the contactless card 216 by computing device 204. In many embodiments, prior to communicating the PIN script 258 to the contactless card 216, the computing device 204 may authenticate the PIN script 258. For example, computing device 204 may authenticate the PIN script 258 based on a message authentication code received from the backend server 224. In a further example, the computing device 204 may utilize an integration key to authenticate the PIN script 258 based on the MAC received from the backend server 224.

In several embodiments, NFC may be used to communicate the PIN script 258 to the contactless card 216. In some embodiments, the application 214 may prompt a user to tap the contactless card 216 (or bring it within sufficient proximity) to the computing device 204 for transmission of the PIN script 258. For example, in response to receiving the PIN script 258 from backend server 224, the application 214 may utilize user interface 210 to prompt a user to tap the contactless card 216 to the computing device 204. Once the contactless card 216 receives the PIN script 258, processing circuitry may execute the PIN script 258 to change PIN 244 from the current PIN to the updated PIN 222. In some embodiments, an applet 234 may utilize the PIN script 258 to update the PIN 244 in the memory of the contactless card 204.

In embodiments, the PIN script 258 may written in a script language, such as Python, Ruby, JavaScript, etc., and the instructions may be human-readable. In other instances, the PIN script 258 may be executable and configured in a binary format. Embodiments are not limited in this manner.

Figure 3:
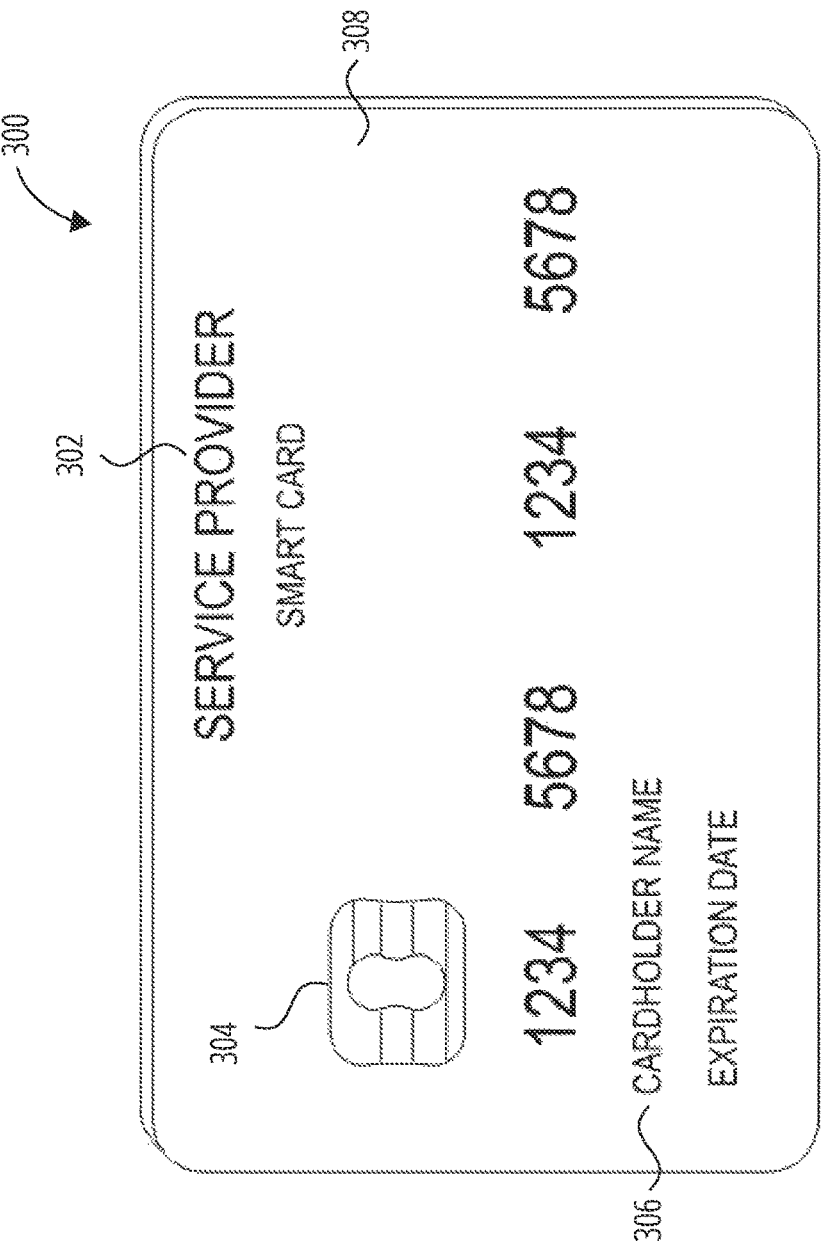
FIG. 3 illustrates an exemplary transaction card according to one or more embodiments described hereby.

FIG. 3 illustrates an example configuration of a transaction card 300, which may include a contactless card, a payment card, such as a credit card, debit card, or gift card, issued by a service provider as displayed as service provider indicia 302 on the front or back of the transaction card 300. In many embodiments, the transaction card 300 may be the same or similar to contactless card 116. In some examples, the transaction card 300 is not related to a payment card, and may include, without limitation, an identification card. In some examples, the transaction card may include a dual interface contactless payment card, a rewards card, and so forth. The transaction card 300 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 300 may have physical characteristics compliant with the ID-1 format of the ISO/IEC 7816 standard, and the transaction card may otherwise be compliant with the ISO/IEC 14443 standard. However, it is understood that the transaction card 300 according to the present disclosure may have different characteristics, and the present disclosure does not require a transaction card to be implemented in a payment card. In some embodiments, FIG. 3 may include one or more components that are the same or similar to one or more other components of the present disclosure. For example, transaction card 300 may be the same or similar to contactless cards 116, 216 Further, one or more components of FIG. 3, or aspects thereof, may be incorporated into other embodiments of the present disclosure, or excluded from the described embodiments, without departing from the scope of this disclosure. Still further, one or more components of other embodiments of the present disclosure, or aspects thereof, may be incorporated into one or more components of FIG. 3, without departing from the scope of this disclosure. Embodiments are not limited in this context.

The transaction card 300 may also include identification information 306 displayed on the front and/or back of the card, and a contact pad 304. The contact pad 304 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The transaction card 300 may also include processing circuitry, antenna and other components as will be further discussed in FIG. 4. These components may be located behind the contact pad 304 or elsewhere on the substrate 308, e.g., within a different layer of the substrate 308, and may electrically and physically coupled with the contact pad 304. The transaction card 300 may also include a magnetic strip or tape, which may be located on the back of the card (not shown in FIG. 3). The transaction card 300 may also include a Near-Field Communication (NFC) device coupled with an antenna capable of communicating via the NFC protocol. Embodiments are not limited in this manner.

Figure 4:
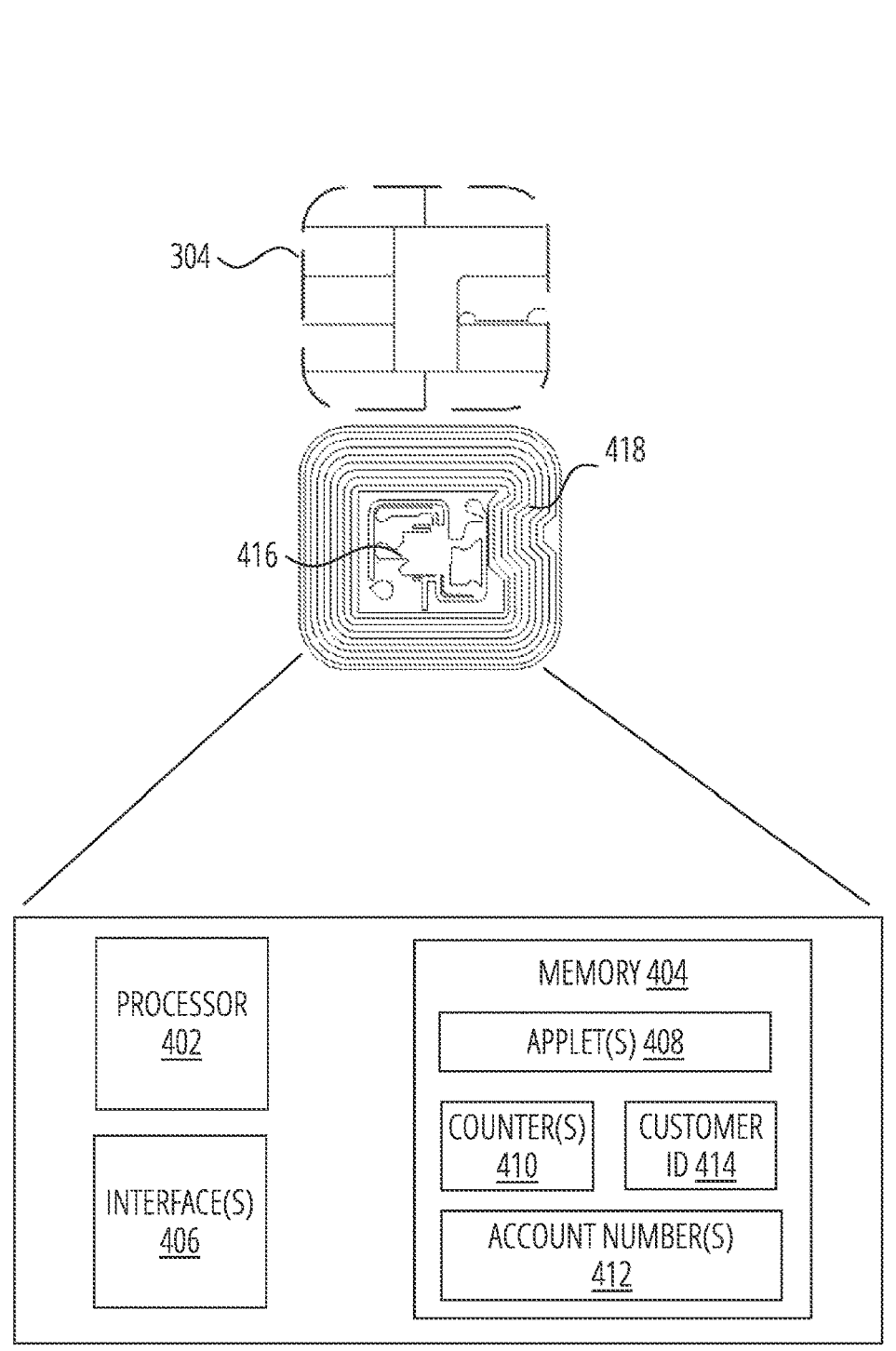
FIG. 4 illustrates various aspects of a transaction card according to one or more embodiments described hereby.

As illustrated in FIG. 4, the contact pad 304 of transaction card 300 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, keys, identifiers, security primitives, and tamperproofing hardware, as necessary to perform the functions described herein.

The memory 404 may be a read-only memory, write-once read-multiple memory or read/write memory, e.g., RAM, ROM, and EEPROM, and the transaction card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypted data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s)

410 may comprise a numeric counter sufficient to store an integer. The customer identifier 414 may comprise a unique alphanumeric identifier assigned to a user of the transaction card 300, and the identifier may distinguish the user of the contactless card from other contactless card users. In some examples, the customer identifier 414 may identify both a customer and an account assigned to that customer and may further identify the transaction card 300 associated with the customer's account. As stated, the account number(s) 412 may include thousands of one-time use virtual account numbers associated with the transaction card 300. An applet(s) 408 of the transaction card 300 may be configured to manage the account number(s) 412 (e.g., to select an account number(s) 412, mark the selected account number(s) 412 as used, and transmit the account number(s) 412 to a mobile device for autofilling by an autofilling service.

The processor 402 and memory elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the transaction card 300 may comprise one or more antenna(s) 418. The one or more antenna(s) 418 may be placed within the transaction card 300 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of transaction card 300 may act as the secondary of an air core transformer. The terminal may communicate with the transaction card 300 by cutting power or amplitude modulation. The transaction card 300 (e.g., contactless card 116) may infer the data transmitted from the terminal using the gaps in the contactless card's power connection, which may be functionally maintained through one or more capacitors. The transaction card 300 may communicate back by switching a load on the contactless card's coil or load modulation. Load modulation may be detected in the terminal's coil through interference. More generally, using the antenna(s) 418, processor 402, and/or the memory 404, the transaction card 300 provides a communications interface to communicate via NFC, Bluetooth, and/or Wi-Fi communications.

As explained above, transaction card 300 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s)

408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the transaction card 300 and server may include certain data such that the card may be properly identified. The transaction card 300 may include one or more unique identifiers (not pictured). Each time a read operation takes place, the counter(s) 410 may be configured to increment. In some examples, each time data from the transaction card 300 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The transaction card 300 is unable to determine the application transaction counter(s) 410 since there is no communication between applet(s) 408 on the transaction card 300. In some examples, the transaction card 300 may comprise a first applet 440-1, which may be a transaction applet, and a second applet 440-2. Each applet 440-1 and 440-2 may comprise a respective counter 410.

In some examples, the counter(s) 410 may get out of sync. In some examples, to account for accidental reads that initiate transactions, such as reading at an angle, the counter(s) 410 may increment but the application does not process the counter(s) 410. In some examples, when the mobile device 10 is woken up, NFC may be enabled and the device 110 may be configured to read available tags, but no action is taken responsive to the reads.

To keep the counter(s) 410 in sync, an application, such as a background application, may be executed that would be configured to detect when a device (e.g., computing device 104) wakes up and synchronize with the server of a banking system indicating that a read that occurred due to detection to then move the counter forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the transaction card 300, two cryptographic keys may be assigned uniquely per card. The cryptographic keys may comprise symmetric keys which may be used in both encryption and decryption of data. Triple DES (3DES) algorithm may be used by EMV and it is implemented by hardware in the transaction card 300. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 116 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
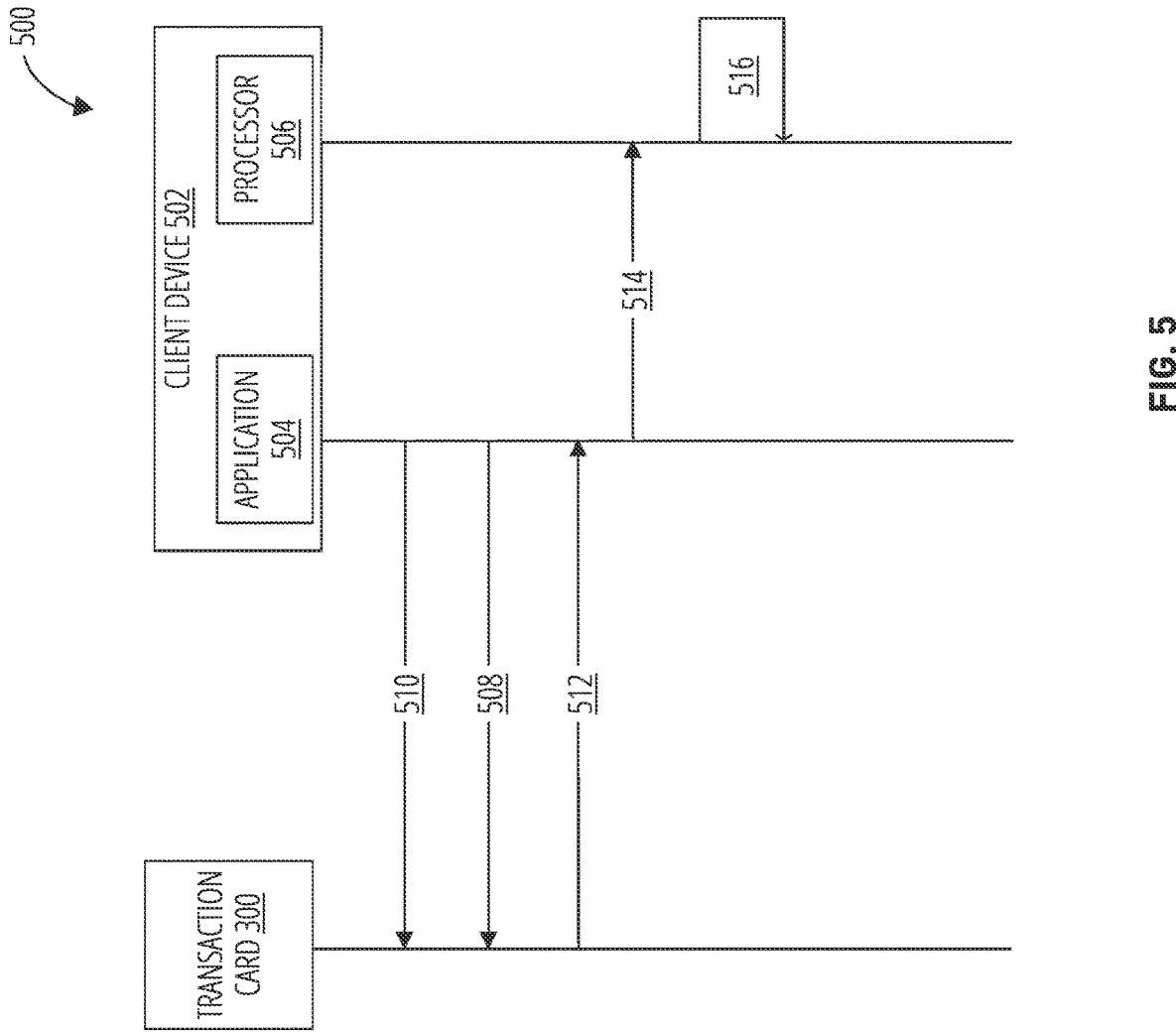
FIG. 5 illustrates a sequence flow 500 according to one or more embodiments described hereby.

FIG. 5 is a timing diagram illustrating an example sequence for providing authenticated access according to one or more embodiments of the present disclosure. Sequence flow 500 may include transaction card 300 and client device 502, which may include an application 504 and processor 506.

At line 510, the application 504 communicates with the transaction card 300 (e.g., after being brought near the transaction card 300). Communication between the application 504 and the transaction card 300 may involve the transaction card 300 being sufficiently close to a card reader (not shown) of the client device 502 to enable NFC data transfer between the application 504 and the transaction card 300.

At line 508, after communication has been established between client device 502 and transaction card 300, transaction card 300 generates a message authentication code (MAC) cryptogram. In some examples, this may occur when the transaction card 300 is read by the application 504. In particular, this may occur upon a read, such as an NFC read, of a near field data exchange (NDEF) tag, which may be created in accordance with the NFC Data Exchange Format. For example, a reader application, such as application 504, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the transaction card 300 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 504 may be configured to transmit a request to transaction card 300, the request comprising an instruction to generate a MAC cryptogram.

At line 512, the transaction card 300 sends the MAC cryptogram to the application 504. In some examples, the transmission of the MAC cryptogram occurs via NFC, however, the present disclosure is not limited thereto. In other examples, this communication may occur via Bluetooth, Wi-Fi, or other means of wireless data communication. At line 514, the application 504 communicates the MAC cryptogram to the processor 506.

At line 516, the processor 506 verifies the MAC cryptogram pursuant to an instruction from the application 122. For example, the MAC cryptogram may be verified, as explained below. In some examples, verifying the MAC cryptogram may be performed by a device other than client device 502, such as a server of a banking system in data communication with the client device 502. For example, processor 506 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 6:
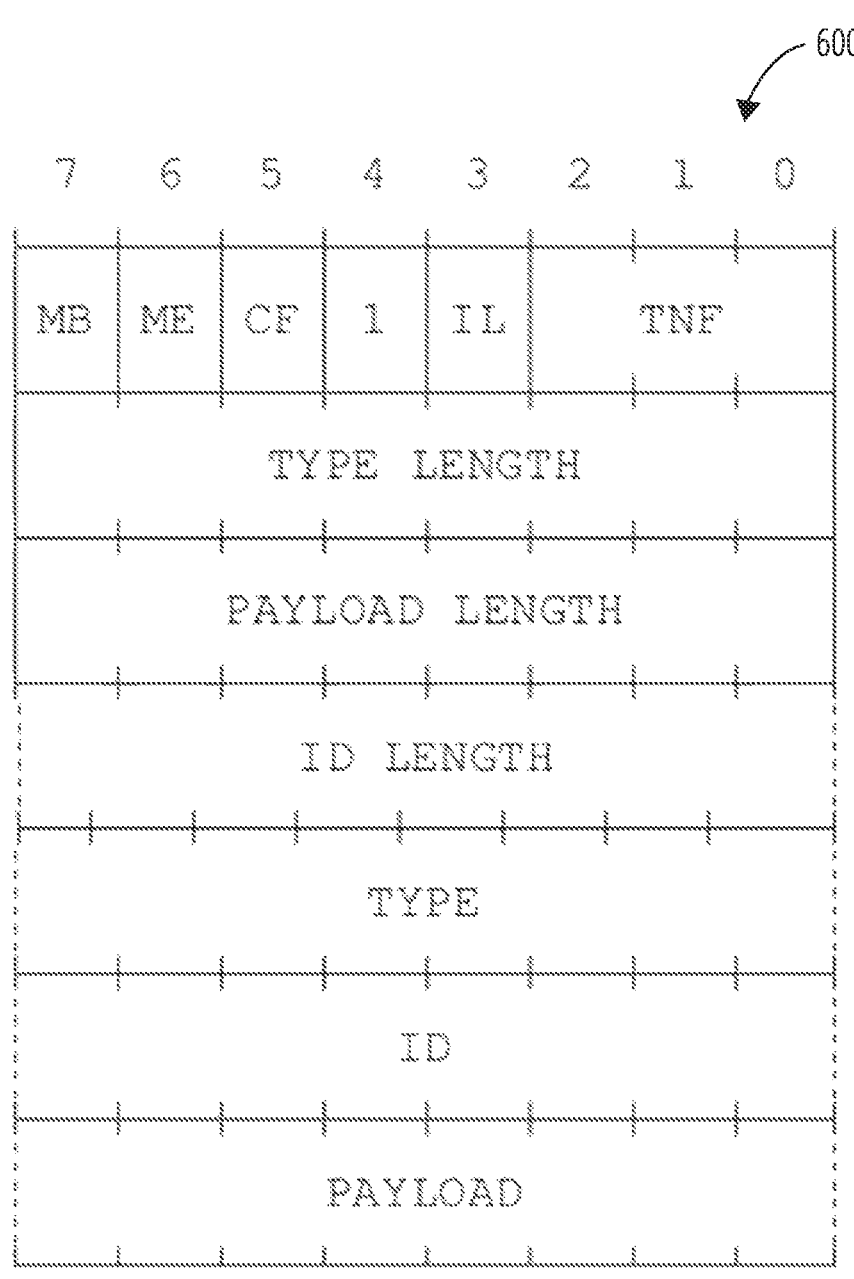
FIG. 6 illustrates a data structure 600 according to one or more embodiments described hereby.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 7 illustrates one embodiment of a logic flow 700, which may be representative of operations that may be executed in various embodiments in conjunction with techniques disclosed hereby. The logic flow 700 may be representative of some or all of the operations that may be executed by one or more components/devices/environments described herein, such as one or more of contactless cards 116, 216, computing devices 104, 204, backend servers 124, 224, key management services 130, 230, and hardware security modules 132, 232.

In the illustrated embodiment, logic flow 700 may begin at block 702. At block 702, a user may be authenticated based on credentials received via a user interface. For example, a user may be authenticated based on credentials received via user interface 110 of computing device 104. Continuing to block 704, the logic flow 700 includes receiving a cryptogram from a contactless card in proximity to a computing device. For example, cryptogram 122 received from contactless card 116 may be detected by application 114 executing on a computing or mobile device. Proceeding to block 706, the logic flow 700 includes determining that a contactless card is associated with the user based on authentication of the cryptogram. For example, backend server 124 may determine contactless card 116 is associated with the user logged into application 114 based on authentication of cryptogram 122. In some embodiments, the association may be communicated from backend server 124 to computing device 104 in verification 156.

At block 708, the logic flow 700 includes presenting, via the user interface, a current personal identification number (PIN) associated with the contactless card based on authentication of the user and authentication of the cryptogram. The current PIN is associated with the contactless card may be presented via the user interface based on authentication of the user and authentication of the cryptogram. For example, a current PIN may be presented via user interface 110 of computing device 104 based on authentication of the user based on login credentials 154 and authentication of the cryptogram 122.

At block 710 the logic flow 700 includes determining to change the current PIN associated with the contactless card to a new or different PIN from the current PIN associated with the contactless card. For example, application 214 may determine to change PIN 244 associated with contactless card 216 to an updated PIN based on input received via user interface 210. At block 712 the logic flow 700 includes identifying the updated PIN based on input received via the user interface, where the updated PIN may be identified based on input received via the user interface. For example, updated PIN 222 may be determined based on input received via user interface 210.

At block 714, the logic flow 700 includes communicating the updated PIN to a server to associate the updated PIN with the contactless card, wherein the updated PIN may be communicated to a server to associate the updated PIN with the contactless card. For example, computing device 204 may communicate updated PIN 222 to backend server 224 via network 242 to associate the updated PIN 222 with contactless card 216.

At block 716, the logic flow 700 includes identifying a PIN script received from the server in response to communication of the updated PIN to the server, wherein the PIN script received from the server may be identified in response to communication of the updated PIN to the server. For example, PIN script 258 may be identified by application 214 in response to communication of updated PIN 222 to the backend server 224. As will be appreciated, the updated PIN 222 may be received as part of a larger data package sent from computing device 204 to backend server 224. Continuing to block 718, the logic flow 700 includes communicating the PIN script to the contactless card to change a PIN stored on the contactless card from the current PIN to the updated PIN. The PIN script may be communicated to the contactless card to change a PIN stored on the contactless card from the current PIN to the updated PIN. For example, computing device 204 may communicate PIN script 258 to contactless card 216 to change PIN 244 stored in memory 218 of the contactless card 216 from the current PIN to the updated PIN 222.

FIG. 8 illustrates an example routine 800 that may be performed by a contactless card in accordance with embodiments discussed herein.

In block 802, the routine 800 includes receiving, by a contactless card, request for identifying information from a computing device. For example, the contactless card may receive a request for authentication from a computing device, such as a mobile device, as part of an NFC exchange. The identifying information may include a customer identifier or a token that may be configured to uniquely identify the contactless card (and associated user), as discussed herein.

In block 804, routine 800 includes generating, by the contactless card, a cryptogram comprising the identifying information. As discussed herein, the cryptogram may be generated to include identifying information and encrypted by applying a cryptographic algorithm. In some instances, the cryptographic algorithm may utilize a session key generated based on at least a master key and a counter value of the contactless card. Further and in block 806, the routine 800 includes communicating by the contactless card, the cryptogram to the computing device.

The computing device may receive the cryptogram and send the cryptogram to one or more backend servers to authenticate the identifying information and contactless card. If authenticated and a user successfully logins into an application on the computing device, the user may be permitted to perform one on more operations including updating the PIN of the contactless. In response to the user selecting to update the PIN, the computing device may communicate and perform one or more operations to update a current PIN with a new PIN on the backend server, as discussed herein.

In embodiments, the backend server may generate a script or a set of instructions or operations that may then be communicated to the contactless card. The script may cause the contactless card to update the PIN. For example, the script may include information, such as the new PIN and one or more instructions to cause the contactless card to write the new PIN in a memory associated with a current PIN. Embodiments are not limited in this manner. For example, the instructions may include authentication instructions that may be utilized by the contactless card authenticate the script. The backend server may send the script (PIN script) to the computing device to further communicate to the contactless card. In some instances, the backend server may encrypt the script with an encryption algorithm. In one example, the backend server may utilize the session key used to authenticate the cryptogram.

In block 808, the routine 800 includes receiving, by the contactless card, a PIN script from the computing device. As discussed, the PIN script may include one or more instructions configured to cause the contactless card to change a current PIN to a new PIN. In some instances, the contactless card may first decrypt the PIN script by utilizing the session key used to generate the cryptogram.

In block 810, the routine 800 includes causing, by the contactless card, the current PIN to change to the new PIN based on the PIN script. For example, the PIN script may cause the new PIN to be written in a memory location to store PINs, such as the memory location associated with the current PIN.

Figure 9:
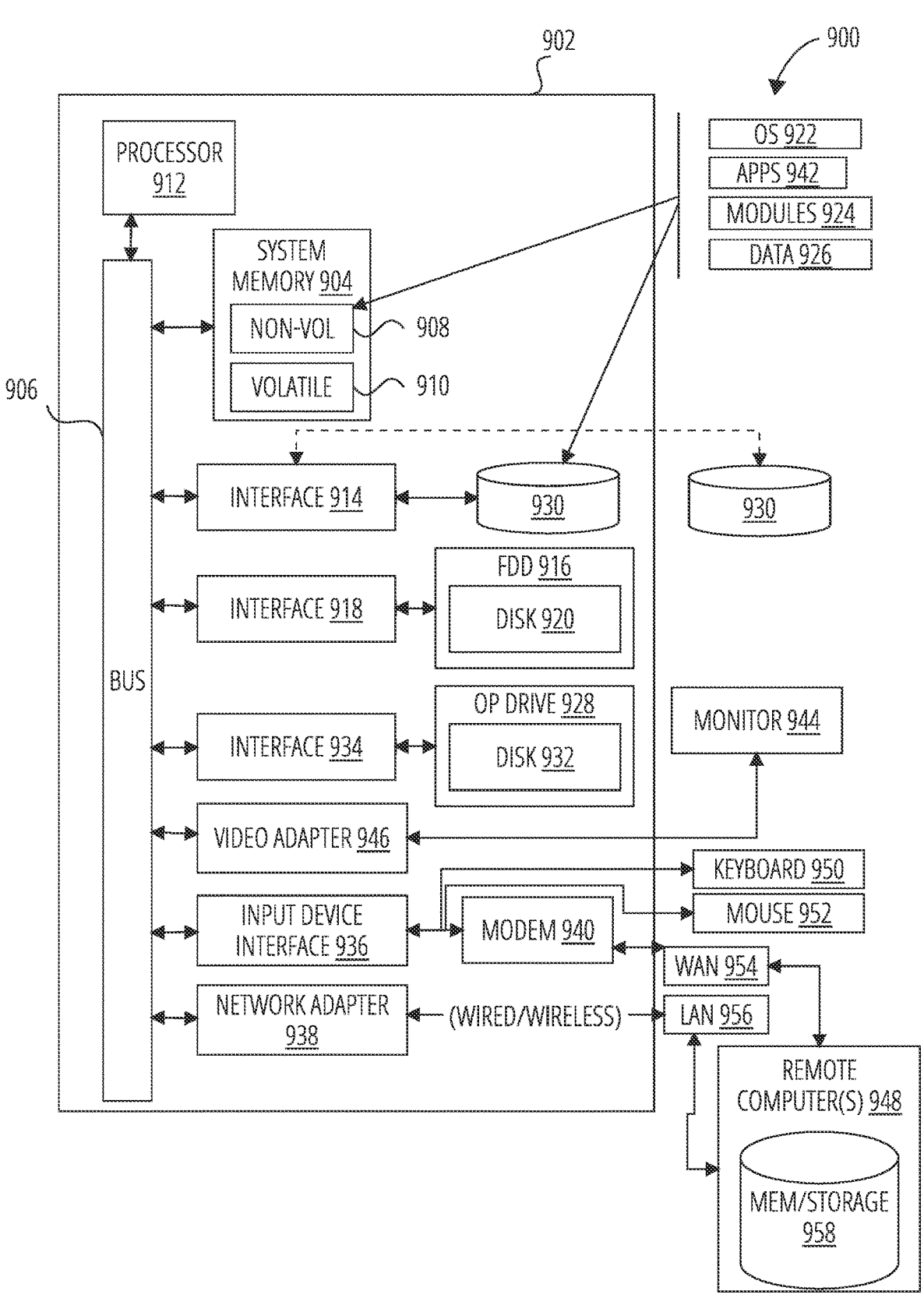
FIG. 9 illustrates a computer architecture 900 in accordance with one embodiment.

FIG. 9 illustrates an embodiment of an exemplary computer architecture 900 suitable for implementing various embodiments as previously described. In one embodiment, the computer architecture 900 may include or be implemented as part of one or more systems or devices discussed herein, such as a computing device or backend server.

As used in this application, the terms "system" and "component" are intended to refer to a computer-related entity, either hardware, a combination of hardware and software, software, or software in execution, examples of which are provided by the exemplary computing computer architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 9, the computing architecture 100 includes a processor 912, a system memory 904 and a system bus 906. The processor 912 can be any of various commercially available processors.

The system bus 906 provides an interface for system components including, but not limited to, the system memory 904 to the processor 912. The system bus 906 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 904 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 904 can include non-volatile 908 and/or volatile 910. A basic input/output system (BIOS) can be stored in the non-volatile 908.

The computer 902 may include various types of computer-readable storage media in the form of one or more lower speed memory units, including an internal (or external) hard disk drive 930, a magnetic disk drive 916 to read from or write to a removable magnetic disk 920, and an optical disk drive 928 to read from or write to a removable optical disk 932 (e.g., a CD-ROM or DVD). The hard disk drive 930, magnetic disk drive 916 and optical disk drive 928 can be connected to system bus 906 the by an HDD interface 914, and FDD interface 918 and an optical disk drive interface 934, respectively. The HDD interface 914 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 908, and volatile 910, including an operating system 922, one or more applications 942, other program modules 924, and program data 926. In one embodiment, the one or more applications 942, other program modules 924, and program data 926 can include, for example, the various applications and/or components of the systems discussed herein.

A user can enter commands and information into the computer 902 through one or more wire/wireless input devices, for example, a keyboard 950 and a pointing device, such as a mouse 952. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 912 through an input device interface 936 that is coupled to the system bus 906 but can be connected by other interfaces such as a parallel port, IEEE 1394 serial port, a game port, a USB port, an IR interface, and so forth.

A monitor 944 or other type of display device is also connected to the system bus 906 via an interface, such as a video adapter 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all the elements described relative to the computer 902, although, for purposes of brevity, only a memory and/or storage device 958 is illustrated. The logical connections depicted include wire/wireless connectivity to a local area network 956 and/or larger networks, for example, a wide area network 954. Such LAN and WAN networking environments are commonplace in offices and companies, and facilitate enterprise-wide computer networks, such as intranets, all of which may connect to a global communications network, for example, the Internet.

When used in a local area network 956 networking environment, the computer 902 is connected to the local area network 956 through a wire and/or wireless communication network interface or network adapter 938. The network adapter 938 can facilitate wire and/or wireless communications to the local area network 956, which may also include a wireless access point disposed thereon for communicating with the wireless functionality of the network adapter 938.

When used in a wide area network 954 networking environment, the computer 902 can include a modem 940, or is connected to a communications server on the wide area network 954 or has other means for establishing communications over the wide area network 954, such as by way of the Internet. The modem 940, which can be internal or external and a wire and/or wireless device, connects to the system bus 906 via the input device interface 936. In a networked environment, program modules depicted relative to the computer 902, or portions thereof, can be stored in the remote memory and/or storage device 958. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 10:
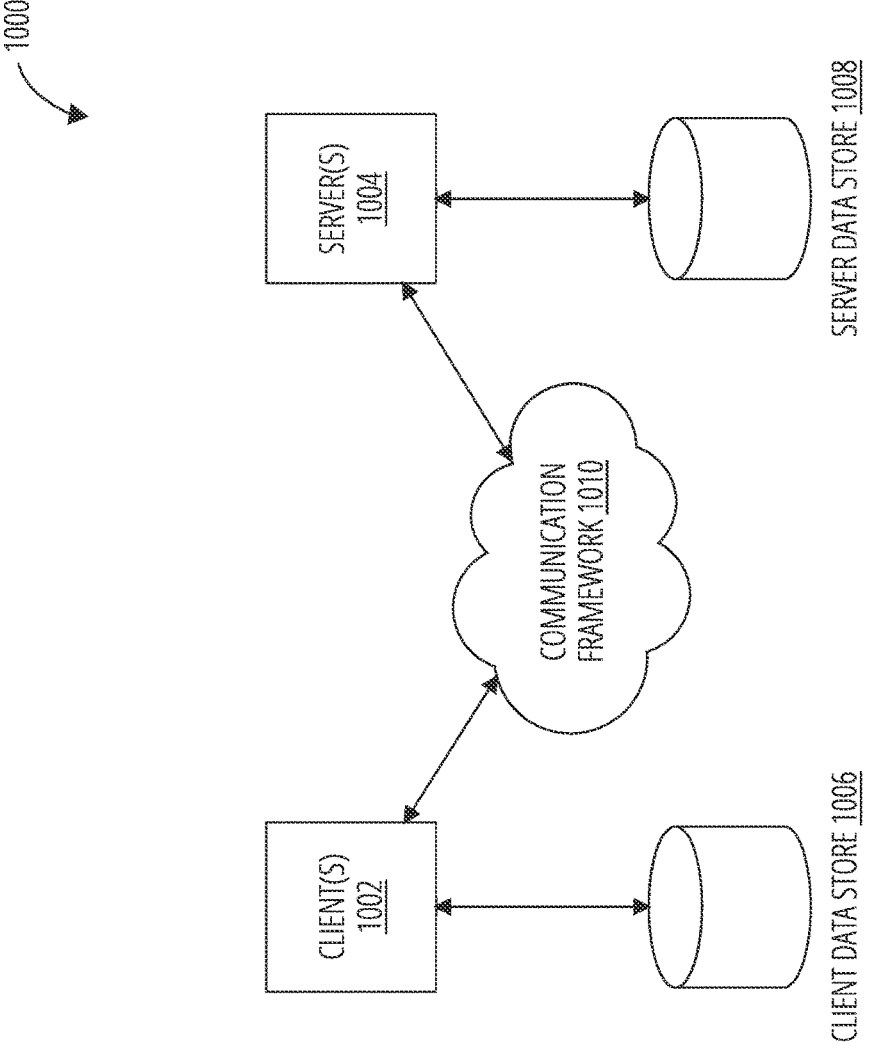
FIG. 10 illustrates a communications architecture 1000 in accordance with one embodiment.

FIG. 10 is a block diagram depicting an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000, which may be consistent with systems and devices discussed herein.

As shown in FIG. 10, the communications architecture 1000 includes one or more client(s) 1002 and server(s) 1004. The server(s) 1004 may implement one or more functions and embodiments discussed herein. The client(s) 1002 and the server(s) 1004 are operatively connected to one or more respective client data store 1006 and server data store 1008 that can be employed to store information local to the respective client(s) 1002 and server(s) 1004, such as cookies and/or associated contextual information.

The client(s) 1002 and the server(s) 1004 may communicate information between each other using a communication framework 1010. The communication framework 1010 may implement any well-known communications techniques and protocols. The communication framework 1010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1002 and the server(s) 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to FIGS. 1A-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores"

may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:

a processor; and memory comprising instructions that when executed by the processor, cause the processor to:

authenticate a user based on credentials received via a user interface;

detect a cryptogram received from a contactless card in proximity to the processor;

determine the contactless card is associated with the user based on authentication of the cryptogram;

present, via the user interface, a current personal identification number (PIN) associated with the contactless card based on authentication of the user and authentication of the cryptogram;

determine to change the current PIN associated with the contactless card to an updated PIN;

identify the updated PIN based on input received via the user interface;

encrypt and then communicate the updated PIN to a server to associate the updated PIN with the contactless card;

identify a PIN script received from the server in response to communication of the updated PIN to the server, wherein the PIN script is executable and configured in a binary format;

receive a message authentication code (MAC) from the server;

authenticate the PIN script based on the MAC received from the server; and communicate the PIN script to the contactless card to change a PIN stored on the contactless card from the current PIN to the updated PIN.

2. The apparatus of claim 1, wherein a mobile device comprises the processor and the memory and the cryptogram is received from the contactless card via near field communication; and wherein the mobile device comprises the user interface on which the current PIN is presented.

3. The apparatus of claim 1, wherein the instructions, when executed by the processor, further cause the processor to communicate the cryptogram to the server and receive a verification from the server to authenticate the cryptogram; and wherein the cryptogram is based on one or more of a master key of the contactless card, an integration key of the contactless card, a unique identifier assigned to the contactless card, and the current PIN.

4. The apparatus of claim 1, wherein the instructions, when executed by the processor, further cause the processor to encrypt the updated PIN based on a unique identifier (UID) received from the contactless card.

5. The apparatus of claim 4, wherein the unique identifier identifies an account associated with the contactless card.

6. The apparatus of claim 4, wherein the instructions, when executed by the processor, further cause the processor to generate a session key with the UID to encrypt the updated PIN based on the UID.

7. The apparatus of claim 1, wherein authenticating the PIN script based on the MAC received from the server includes the processor being configured to utilize an integration key to authenticate the PIN script based on the MAC received from the server.

8. The apparatus of claim 7, wherein the integration key is used to calculate the MAC.

9. At least one non-transitory computer-readable medium comprising a set of instructions that, in response to being executed by a processor circuit, cause the processor circuit to:

authenticate a user based on credentials received via a user interface;

detect a cryptogram received from a contactless card in proximity to the processor;

determine the contactless card is associated with the user based on authentication of the cryptogram;

present, via the user interface, a current personal identification number (PIN) associated with the contactless card based on authentication of the user and authentication of the cryptogram;

determine to change the current PIN associated with the contactless card to an updated PIN;

identify the updated PIN based on input received via the user interface;

encrypt and then communicate the updated PIN to a server to associate the updated PIN with the contactless card;

identify a PIN script received from the server in response to communication of the updated PIN to the server, wherein the PIN script is executable and configured in a binary format;

receive a message authentication code (MAC) from the server;

authenticate the PIN script based on the MAC received from the server; and communicate the PIN script to the contactless card to change a PIN stored on the contactless card from the current PIN to the updated PIN.

10. The at least one non-transitory computer-readable medium of claim 9, wherein the set of instructions, in response to execution by the processor circuit, further cause the processor circuit to communicate the cryptogram to the server and receive a verification from the server to authenticate the cryptogram;

wherein the cryptogram is based on one or more of a master key of the contactless card, an integration key of the contactless card, a unique identifier assigned to the contactless card, and the current PIN; and wherein the user interface is located on a mobile device distinct from the contactless card.

11. The at least one non-transitory computer-readable medium of claim 9, wherein the set of instructions, in response to execution by the processor circuit, further cause the processor circuit to encrypt the updated PIN based on a unique identifier (UID) received from the contactless card.

12. The at least one non-transitory computer-readable medium of claim 11, wherein the unique identifier identifies an account associated with the contactless card.

13. The at least one non-transitory computer-readable medium of claim 11, wherein the set of instructions, in response to execution by the processor circuit, further cause the processor circuit to generate a session key with the UID to encrypt the updated PIN based on the UID.

14. The at least one non-transitory computer-readable medium of claim 9, wherein authenticating the PIN script based on the MAC received from the server includes the processing circuit being configured to utilize an integration key to authenticate the PIN script based on the MAC received from the server.

15. The at least one non-transitory computer-readable medium of claim 14, wherein the integration key is used to calculate the MAC.

16. A computer-implemented method, comprising:

authenticating a user based on credentials received via a user interface;

detecting a cryptogram received from a contactless card;

determining the contactless card is associated with the user based on authentication of the cryptogram;

presenting, via the user interface, a current personal identification number (PIN) associated with the contactless card based on authentication of the user and authentication of the cryptogram;

determining to change the current PIN associated with the contactless card to an updated PIN;

identifying the updated PIN based on input received via the user interface;

encrypting and then communicating the updated PIN to a server to associate the updated PIN with the contactless card;

identifying a PIN script received from the server in response to communication of the updated PIN to the server, wherein the PIN script is executable and configured in a binary format;

receiving a message authentication code (MAC) from the server;

authenticating the PIN script based on the MAC received from the server; and communicating the PIN script to the contactless card to change a PIN stored on the contactless card from the current PIN to the updated PIN.

17. The computer-implemented method of claim 16, comprising encrypting the updated PIN based on a unique identifier (UID) received from the contactless card wherein the user interface is part of a mobile device distinct from the contactless card; and wherein the cryptogram is based on one or more of a master key of the contactless card, an integration key of the contactless card, a unique identifier assigned to the contactless card, and the current PIN.

18. The computer-implemented method of claim 17, wherein the unique identifier identifies an account associated with the contactless card.

19. The computer-implemented method of claim 18, comprising generating a session key with the UID to encrypt the updated PIN based on the UID.

20. The computer-implemented method of claim 16, wherein authenticating the PIN script based on the MAC received from the server includes utilizing an integration key to authenticate the PIN script based on the MAC received from the server.

\* \* \* \* \*